US010136654B2

(12) United States Patent
Thrane et al.

(10) Patent No.: US 10,136,654 B2
(45) Date of Patent: Nov. 27, 2018

(54) DEVICE, ASSEMBLY, AND METHOD FOR STUNNING POULTRY

(71) Applicant: LINCO FOOD SYSTEMS A/S, Trige (DK)

(72) Inventors: Uffe Thrane, Hammel (DK); Poul Kjeldsen, Ebeltoft (DK)

(73) Assignee: Linco Food Systems A/S, Trige (DK)

( * ) Notice: Subject to any disclaimer, the term of this patent is extended or adjusted under 35 U.S.C. 154(b) by 0 days.

(21) Appl. No.: 15/747,744

(22) PCT Filed: Jul. 31, 2015

(86) PCT No.: PCT/EP2015/067665
§ 371 (c)(1),
(2) Date: Jan. 25, 2018

(87) PCT Pub. No.: WO2017/020931
PCT Pub. Date: Feb. 9, 2017

(65) Prior Publication Data
US 2018/0160689 A1 Jun. 14, 2018

(51) Int. Cl.
*A22B 3/00* (2006.01)
*A22B 3/08* (2006.01)
(52) U.S. Cl.
CPC ............. *A22B 3/086* (2013.01); *A22B 3/005* (2013.01)
(58) Field of Classification Search
CPC ............. A22B 3/00; A22B 3/05; A22B 3/086
(Continued)

(56) References Cited

U.S. PATENT DOCUMENTS 5,186,677 A * 2/1993 Christensen ............. A22B 1/00
452/53
5,487,699 A * 1/1996 Tyrrell ..................... A22B 3/00
452/53
(Continued)

FOREIGN PATENT DOCUMENTS

EP 1405564 A1 4/2004
EP 1616482 1/2006
(Continued)

OTHER PUBLICATIONS

International Search Report dated Feb. 2, 2016 from International Patent Application No. PCT/EP2015/067665, filed Jul. 31, 2015.
(Continued)

*Primary Examiner* — Richard T Price, Jr.
(74) *Attorney, Agent, or Firm* — Sunstone IP

(57) ABSTRACT

The invention relates to an apparatus, designed and configured for stunning live poultry animals which are intended for slaughter and are located in containers, by means of a gas mixture comprising a stunning gas, which apparatus comprises a stunning chamber having at least two stunning zones, an introduction station, arranged on the inlet side of the stunning chamber, for the or each container containing live poultry animals and a discharge station, arranged on the outlet side of the stunning chamber, for the or each container containing stunned poultry animals, at least one transport conveyor for transporting the or each container in the transport direction T through the stunning zones from the introduction station to the discharge station, as well as means for delivering the gas mixture into the stunning zones of the stunning chamber, which apparatus is characterized in that the means for delivering the gas mixture comprises at least one injection pipe which is designed and configured to be movable relative to the container for detachable connection to the or each container and for detachment therefrom, (Continued)

in such a manner that each container can be filled with the gas mixture when it is in the state of detachable connection to the or each injection pipe. The invention relates further to an arrangement comprising such an apparatus and at least one container, and to a corresponding method.

32 Claims, 4 Drawing Sheets

(58) Field of Classification Search
 USPC ................................................ 452/52, 66
 See application file for complete search history.

(56) References Cited

U.S. PATENT DOCUMENTS

| | | | | |
|---|---|---|---|---|
| 6,126,534 A | * | 10/2000 | Jacobs | A22B 3/00 452/66 |
| 6,848,987 B2 | * | 2/2005 | Draft | A22B 3/005 452/66 |
| 7,097,552 B2 | * | 8/2006 | Ovesen | A22B 3/00 452/53 |
| 7,377,844 B2 | * | 5/2008 | Kildegaard | A22B 3/00 452/66 |
| 7,448,943 B1 | * | 11/2008 | Woodford | A22B 3/005 452/66 |
| 8,591,297 B2 | * | 11/2013 | Lang | A22B 1/00 452/57 |

FOREIGN PATENT DOCUMENTS

| | | |
|---|---|---|
| NL | 9201430 A | 3/1994 |
| WO | 94/15469 A1 | 7/1994 |
| WO | 2008/127667 A1 | 10/2008 |

OTHER PUBLICATIONS

International Preliminary Report on Patentability dated Feb. 6, 2018 from International Patent Application No. PCT/EP2015/067665, filed Jul. 31, 2015.

\* cited by examiner

DEVICE, ASSEMBLY, AND METHOD FOR STUNNING POULTRY

CROSS REFERENCE TO RELATED APPLICATION(S)

This application is a U.S. National Stage Entry of International Patent Application No. PCT/EP2015/067665, filed Jul. 31, 2015, the disclosure of which is hereby incorporated entirely herein by reference.

BACKGROUND

Technical Field

The invention relates to an apparatus, designed and configured for stunning live poultry animals which are intended for slaughter and are located in containers, by means of a gas mixture comprising a stunning gas, which apparatus comprises a stunning chamber having at least two stunning zones, an introduction station, arranged on the inlet side of the stunning chamber, for the or each container containing live poultry animals, and a discharge station, arranged on the outlet side of the stunning chamber, for the or each container containing stunned poultry animals, at least one transport conveyor for transporting the or each container in a transport direction T through the stunning zones from the introduction station to the discharge station, as well as means for delivering the gas mixture into the stunning zones of the stunning chamber.

The invention relates further to an arrangement for stunning live poultry animals which are intended for slaughter and are located in containers, by means of a gas mixture comprising a stunning gas, which arrangement comprises an apparatus for stunning live poultry animals which are intended for slaughter and are located in containers, by means of a gas mixture comprising a stunning gas, as well as at least one container for transporting the poultry animals through the apparatus.

The invention relates further to a method for stunning live poultry animals which are intended for slaughter and are located in containers, by means of a gas mixture comprising a stunning gas, which method comprises the steps: delivering at least one container containing live poultry animals into a stunning chamber by means of an introduction station, transporting the or each container through at least two stunning zones of the stunning chamber by means of at least one transport conveyor, and discharging the or each container containing stunned poultry animals from the stunning chamber by means of a discharge station, wherein the poultry animals located in the or each container are exposed to the gas mixture in the stunning zones of the stunning chamber.

State of the Art

Such apparatuses, arrangements and methods are used in the poultry processing industry for stunning the poultry prior to slaughter. Stunning is understood as meaning both calming (the so-called "sleep" phase) of the poultry animals to deep but reversible loss of consciousness (controlled atmosphere stunning=CAS) as well as stunning to irreversible loss of consciousness, that is to say brain death (controlled atmosphere killing=CAK). The degree of loss of consciousness depends on the concentration of the stunning gas in the gas mixture and/or on the duration of exposure to the gas mixture, for which reason stunning takes place in a plurality of phases with different and in particular increasing concentrations of the stunning gas in the gas mixture. Before the poultry animals are slaughtered, they must be brought into a state of deep loss of consciousness—according to individual guidelines relating to animal protection—to brain death. However, the period of time between loss of consciousness, in particular when brain death has occurred, and slaughter, or cutting of the throat or head, must be kept as short as possible so that the heart still has a residual function upon slaughter in order to assist with the exsanguination process after cutting of the throat or head.

The stunning of poultry animals, in particular of broilers, but also of ducks, geese, turkeys or the like, takes place in a plurality of stages in order to comply with the relevant guidelines relating to animal protection. For stunning in stages, the apparatuses have at least two stunning zones in which the poultry animals are exposed to gas mixtures having different concentrations of the stunning gas. $CO_2$ may be mentioned purely by way of example as a stunning gas. However, other permitted stunning gases as a constituent of the gas mixture can likewise be used. According to an EU guideline 1099/2009, the poultry animals must be completely unconscious before they are exposed to a gas concentration of more than 40% stunning gas in the gas mixture. Only when the poultry animals are definitely completely unconscious are they exposed to a gas mixture that contains a proportion of more than 40% stunning gas in the gas mixture and can lead to a deep and long-lasting loss of consciousness ("stunned") to brain death ("killed") of the poultry animals.

A large number of apparatuses, arrangements and methods are known in which the poultry animals are transported singly through stunning chambers, for example on a transport conveyor or by means of an overhead conveyor. WO 94/15469 describes such a solution in one of the exemplary embodiments. However, such systems are limited in their capacity. Furthermore, such systems have a considerable space requirement, based on the number of poultry animals to be stunned. Corresponding disadvantages are also exhibited by systems in which individual containers each containing a number of poultry animals are transported through a stunning chamber. EP 1 405 564 A1 from the house of the applicant describes such a system in which containers containing poultry animals are transported through a stunning chamber. In this solution, after entering the stunning chamber, the containers are transported singly, that is to say container by container, downwards in the direction of an increasing concentration of the stunning gas in the gas mixture. For discharge of the containers, they are raised to the delivery level again and transported out of the stunning chamber. Varying the concentration of the stunning gas in the gas mixture, in particular on the basis of the dependence on gravity, is time-consuming and has only limited precision, which makes uniform and efficient stunning of the poultry animals located in a container more difficult. In order to improve the efficiency of such systems, solutions are known in which a plurality of containers arranged one above the other are delivered to the stunning chamber as a stack and are discharged from the stunning chamber again as a stack. WO 94/15469 describes such a system in a further exemplary embodiment.

SUMMARY

The known apparatuses, arrangements and methods all have the common disadvantage, however, that the poultry animals are exposed unevenly to the stunning gas. This concerns in particular those solutions in which the poultry animals are transported through the stunning chamber in a container. The gas mixture in the individual stunning zones thereby acts on the poultry animals from the outside, so that the poultry animals inside a container are exposed to the gas mixture with a different strength and intensity. Poultry animals located in the middle of the container are thus shielded at least partially by the surrounding poultry animals and are supplied with the gas mixture only inadequately. Poultry animals that are introduced into the stunning chamber, transported through the stunning chamber and discharged from the stunning chamber in a plurality of containers stacked one above the other are exposed particularly unevenly to the gas mixture. Those containers of a stack which, after the stack has been discharged from the stunning chamber, are freed of the gas mixture first and then emptied by removing the stunned poultry animals from the container for exsanguination and suspending them, for example, from an overhead conveyor, are exposed to the gas mixture for a significantly shorter time than the poultry animals in the containers of the stack that are only then freed from the gas mixture and emptied. The different dwell times of the poultry animals in an environment enriched with gas mixture lead to uncontrolled stunning. In the case where all the containers are freed from the gas mixture simultaneously after stunning, before the container stack leaves the stunning chamber, the poultry animals are nevertheless treated unevenly because the period of time between stunning and exsanguination is only very short for the poultry animals from the container of a container stack that is emptied first, whereas that period of time is significantly longer for the poultry animals of the container of the container stack that is emptied last. In other words, not only does the duration of exposure to the gas mixture vary, but also the period of time between the end of stunning and exsanguination, with the result that, in the case of some poultry animals that are exposed to the gas mixture for longer or remain in the stunned state, or in the state of brain death, for longer, before they are slaughtered for exsanguination, there is no longer any residual heart function, so that exsanguination after slaughtering or cutting of the head is made more difficult.

Accordingly, the object underlying the invention is to propose a simple and compact apparatus which ensures that all the poultry animals are stunned uniformly and reliably and also assists with rapid and uniform transition of all the poultry animals from stunning to exsanguination. The object consists further in proposing a corresponding arrangement and a corresponding method.

The object is achieved by an apparatus having the features mentioned at the beginning in that the means for delivering the gas mixture comprises at least one injection pipe which is designed and configured to be movable relative to the container for detachable connection to the or each container and for detachment therefrom, in such a manner that each container can be filled with the gas mixture when it is in the state of detachable connection to the or each injection pipe. Injection pipe is understood as meaning not only a rigid pipe but also flexible line elements which are suitable for delivering the gas mixture. Detachable connection means, for example, the coupling of the injection line to the container so that the gas mixture flowing out of the injection pipe is guided into the interior of the container, for which reason the container must have a corresponding inlet. The detachable connection describes all adaptations of the injection pipe to the container which ensure that the gas mixture is introduced directly into the interior of the container. Stunning chamber refers in the broadest sense to all open or closed frames, housings, troughs, tunnels or the like. By means of the configuration according to the invention there is created an apparatus by means of which any container can be filled singly and individually with the gas mixture so that it is thus ensured that all the poultry animals in a container, and in particular also all the poultry animals in a stack formed of two or more containers, can be exposed to the gas mixture with the same concentration of the stunning gas in the gas mixture in each of the stunning zones and for exactly the same period of time from introduction in the region of the introduction station into the stunning chamber to discharge in the region of the discharge station for transfer to the slaughtering operation. Within the meaning of the invention, any reference to a stack is expressly understood as meaning also an individual container. A stack can accordingly be formed of a single container or of a plurality of containers arranged one above the other. Each stack is closed at the bottom by the bottom wall of the container situated at the lowermost position of the stack. At the top, each stack is closed either by the bottom wall of the container situated above it or by a lid on the container situated at the uppermost position of the stack, so that individual containers or a plurality of containers stacked one above the other in each case form a type of "closed system". "Closed" because the gas mixture with the stunning gas is heavier than the ambient air within the containers and accordingly sinks towards the floor of the container, and the gas mixture accordingly remains in principle within the container in question. Mixing of gas mixtures between the stunning zones, in which gas mixtures having different concentrations of stunning gas are conventionally used, is thereby prevented. However, this does not rule out the possibility of containers also being at least partially open. Even if the containers have openings, for example in the region of the side walls, for example because of ventilation openings or a grid structure, these openings are "closed" by the poultry animals standing close to one another. The possibility of filling the containers with the gas mixture individually also lays the basis for the first-in-first-out principle, so that the containers that are filled with the gas mixture first are also discharged again first in order to bring the poultry animals, which are now stunned, into a hanging position for delivery and execution of the neck or head cut, through which the poultry animals exsanguinate. The FiFo principle accordingly refers not to the order in which the containers or container stacks are introduced into the stunning chamber, but to the order in which the containers or container stacks are filled with the gas mixture. The apparatus according to the invention thus ensures that the period of time between stunning and exsanguination can be optimised, namely shortened to the greatest possible extent, and is almost identical for all the poultry animals, in particular also for those in a container stack formed of a plurality of containers.

However, the present invention is not limited solely to the use of gases or gas mixtures for stunning that are heavier than the ambient air. Instead, it is also possible to use stunning gases or stunning gas mixtures that are lighter than the ambient air or whose density corresponds to that of the ambient air. Within the meaning of the invention, gas mixture means both gas mixtures and pure gases, which are propelled into the containers, for example, solely on the basis of the pressure prevailing in their storage vessel.

A particularly preferred further development is characterised in that each injection pipe is designed and configured to move into the interior of each container forming a container stack and to move out of the or each container, in such a manner that each container of the container stack, with the poultry animals located therein, can be filled individually and directed from the inside with the gas mixture flowing out of the or each injection pipe. The or each injection pipe makes it possible to supply the containers individually with the gas mixture from the inside. Because the gas mixture can be introduced into the containers on the inside, so that the gas mixture is distributed from the inside outwards, all the poultry animals inside a container can be stunned uniformly. Furthermore, the gas concentration of the stunning gas in the gas mixture in each stunning zone can be changed quickly and simply and, owing to the use of the injection pipes, can be transferred directly into the containers and in particular also independently of the position of the container in a container stack.

An advantageous embodiment is characterised in that the stunning chamber is in the form of a closed stunning tunnel and forms a horizontally oriented stunning line, and the or each transport conveyor is designed and configured along the stunning line for horizontally transporting the or each container in a plane E from stunning zone to stunning zone. Compact stunning that is optimised in terms of the length of the transport path is thereby ensured. In particular, the configuration according to the invention ensures an apparatus that is optimised in terms of the distance to be covered by the containers—in particular between the stunning zone of complete and preferably irreversible loss of consciousness to transfer to the slaughter line. Furthermore, because of its solely horizontal extension, the stunning tunnel can be assembled in a modular manner, so that the number of individual modules in the form of additional stunning zones for delivering gas mixtures of different concentrations of stunning gas or for replenishing gas mixtures and/or in the form of additional evacuation zones for drawing off the gas mixture can be changed in a variable manner, if required. That the stunning tunnel is in closed form means that it is closed on all sides in particular in the region of the stunning zones. In the region of the introduction station and discharge station, the stunning tunnel has openings for introducing the container stacks and for discharging the container stacks. In addition, the stunning tunnel can, for safety reasons, also be sealed with respect to the surroundings, in particular in the region of the openings as well as between the individual stunning zones, in the form of locks or the like.

Advantageously, the or each injection pipe is arranged above the transport path and is designed to be movable vertically up and down, in such a manner that the injection pipe can be moved from an upper waiting position, in which the injection pipe is positioned with its free end completely outside the container of a container stack located beneath the injection pipe that is closest to the injection pipe, into a lower working position, in which the injection pipe is positioned with its free end inside any container of the container stack, and back. By means of this advantageous embodiment, the container stacks can be filled particularly simply with the gas mixture in succession from top to bottom or vice versa. While one stack of containers is positioned stationary beneath the injection pipe, the stepwise filling of the containers of a container stack can take place. Ultimately, the or each injection pipe merely has to be lowered or raised stepwise in order gradually to supply all the levels of a container stack with the gas mixture. To that end, the injection pipe can be connected, coupled or otherwise adapted flush to the container in such a manner that the gas mixture flowing out of the injection pipe is necessarily guided into the container. Preferably, however, the injection pipe projects into the container to be filled. Each container of a container stack within a stunning zone can thereby be filled with exactly the same gas mixture for exactly the same period of time, so that all the poultry animals can be stunned equally, owing to the uniform and precise distribution of the gas mixture, regardless of their position inside a container and regardless of the position of the container in the container stack. By means of this configuration, the first-in-first-out principle is ensured in a particularly simple and effective manner in that the containers of a stack are discharged again at the end of the stunning tunnel in the order in which they were filled with the gas mixture.

In an advantageous further development, at least one injection pipe is associated with each of the stunning zones, in such a manner that each of the stunning zones can be exposed to a gas mixture, in particular having a different concentration of the stunning gas. It is thus possible to position the injection pipes fixed in the horizontal direction, which simplifies the construction of the apparatus. The association of at least one injection pipe with each stunning zone provides a solution which on the one hand is structurally simple and on the other hand shortens the stunning operation. By associating the injection pipes with the respective stunning zones, the individual container stacks are transported cyclically from stunning zone to stunning zone by means of the transport conveyor, whereby the injection pipes must be designed only to be movable up and down vertically for filling the containers while the container stack is stationary. The association of at least one injection pipe with each stunning zone further permits a parallel, synchronous delivery of gas mixtures to all the stunning zones. Preferably, the number of injection pipes in each stunning zone is governed by the number of receivers in the containers for such injection pipes. Depending on the size of the containers, they have one receiver, two or more than two receivers as an inlet for the injection pipes. It is thereby ensured that, even in the case of larger containers for accommodating large poultry animals or for accommodating a large number of poultry animals, constant and uniform filling with the gas mixture can take place. The or each injection pipe associated with a stunning zone can preferably be controlled independently of the or each injection pipe of an adjacent stunning zone as regards vertical adjustment on the one hand and/or the gas mixture flowing through the injection pipe. This independent control relates in each case to adjacent stunning zones. Thus, for example, the or each injection pipe of a first stunning zone with a concentration of, for example, from 5 to 15% stunning gas in the gas mixture (phase I) is controllable independently of the or each injection pipe of a second stunning zone with a concentration of from 30 to 50% stunning gas in the gas mixture (phase II), and this is in turn controllable independently of the or each injection pipe of a third stunning zone with a concentration of from 50 to 100% stunning gas in the gas mixture (phase III). Within a stunning zone, the injection pipes are preferably controllable together or at least in a synchronised manner.

A particularly preferred further development is characterised in that the or each injection pipe has at its free end an adapter head which is designed and configured for adapting the injection pipe to the or in the or each container of a container stack, wherein the adapter head has at least one opening for emission of the gas mixture. Such an adapter head can be designed for coupling to a container, or for coupling in a container. In both cases it is ensured that the gas mixture flowing from the or each opening of the adapter head is guided into the interior of the container.

Advantageously, the adapter head is in the form of a plug-in connector, in such a manner that each injection pipe can be connected in a sealed manner to each container by means of its adapter head without a fixing means, in such a manner that, on the one hand, the or each opening for filling the or each container with the gas mixture points into the interior of the container and, on the other hand, the adapter head is sealed outwardly relative to the container with respect to the surroundings. With respect to the surroundings means in this context that the adapter head is sealed at the bottom—with respect to the bottom wall of the container—and at the top—with respect to a lid element of the container or a bottom wall of the container situated above—in order to prevent the gas mixture from escaping from the container to which the adapter head is adapted. The plug-in connector is a particularly simple form of detachable connection, in particular when the injection pipe is introduced onto the container or into the container or container stack from above.

Preferably, the or each opening for filling is arranged in the adapter head in the longitudinal-axis orientation of the adapter head between two sealing elements of the adapter head. It is thereby ensured on the one hand that the gas mixture is delivered precisely into the interior of an individual container of a container stack and on the other hand that the container is shielded from other containers or from the surroundings. In other words, this embodiment allows an individual container of a container stack to be filled on its own, while adjacent containers are effectively shielded from the container that is currently in the process of being filled.

An advantageous embodiment is characterised in that each injection pipe has an associated means for determining the gas concentration of the stunning gas in the gas mixture inside the container and/or for visually monitoring the interior of the container. With this embodiment of a monitoring system, which is preferably designed to be movable, the stunning operation can be monitored particularly efficiently. For example, by means of the claimed means the current concentration of stunning gas in the gas mixture that is delivered can be determined and recorded, and/or the behaviour of the poultry animals in each container of a container stack and in each stunning zone can be monitored and recorded.

Advantageously, the apparatus comprises a control and/or regulating unit by means of which the transport speed of the or each transport conveyor and the composition of the gas mixture in terms of the concentration of stunning gas in the gas mixture can be controlled and/or regulated. In addition to the mentioned control and regulation parameters, the movement of each injection pipe, the introduction station, the discharge station and also further components involved in the stunning operation can be controlled and/or regulated. Automated stunning that is adapted individually to the particular poultry bodies can thus be ensured.

Particularly preferably, at least two injection pipes are associated with each stunning zone, which injection pipes are connected to a common supply pipe. Simple filling of the containers having corresponding receivers/inlets in each stunning zone is thereby achieved. As a result of the common supply pipe, only a single connection to a delivery device for the gas mixture is necessary.

A particularly advantageous embodiment is characterised in that at least two introduction stations are provided along the transport path. Flexible control of stunning as regards the duration of the stunning operation and/or the length of the transport path in dependence on the size of the poultry animals and/or the number of poultry animals per container and/or the degree of stunning is thereby ensured. Owing to the at least two introduction stations, which are located at different positions along the transport path, the container stacks can be delivered to the stunning chamber earlier or later, in terms of space, according to their content (small, medium or large poultry animals) or according to the desired degree of stunning (CAS or CAK), in order to shorten or lengthen the transport distance to the discharge station. With this apparatus, all poultry animals, that is to say small, medium and large poultry animals, can accordingly be stunned with the same uniformity and precision and matched to the particular size of poultry animal.

Advantageously, the or each introduction station is designed and configured to introduce the or each container or container stack onto the transport path vertically and/or horizontally. Depending on the conditions at the production site, delivery can take place in the vertical direction, preferably from above, for example by means of a lift device, and/or in the horizontal direction from the side, for example by means of a transverse conveyor, in order to guide the container stacks into the stunning chamber. A compact apparatus is thus created. Moreover, the same also applies to the or each discharge station.

A particularly preferred further development is characterised in that at least one suction pipe for drawing off the gas mixture from each container is arranged downstream of the stunning zones and upstream of the discharge station in the transport direction T, wherein the or each suction pipe is preferably of the same construction as the injection pipe. The gas mixture can thereby be removed again, namely drawn off, in the manner and especially in the order in which it was introduced into the containers so that the FiFo principle relating to the delivery and evacuation of the gas mixture, which ensures identical exposure of all the poultry animals in respect of the concentration of the stunning gas in the gas mixture and the duration of the exposure, is supported here too. Moreover, the presence of an evacuation zone, in which the gas mixture is drawn off from each container, ensures that the gas mixture does not pass into the surroundings when the containers are opened for removal of the stunned poultry animals, as a result of which the safety of the apparatus is increased. Furthermore, owing to the or each suction pipe for drawing off the gas mixture, the gas mixture can be reused, which substantially improves the efficiency of the apparatus.

Advantageously, the discharge station arranged at the outlet-side end of the transport path is designed and configured to discharge the containers singly according to the first-in-first-out (FiFo) principle. As already mentioned above, the FiFo principle accordingly relates not to the order in which the containers or container stacks are introduced into the stunning chamber but to the order in which the containers of a container stack are filled with the gas mixture and freed of the gas mixture. Immediately after drawing off, that is to say evacuation, of the gas mixture, each container can thereby be discharged by means of the discharge station into the region in which the poultry animals are removed from the interior of the container, which is then free of gas, and brought into the hanging position, namely into so-called shackles for overhead accommodation, while the gas mixture is still being drawn off from the other containers of the container stack. The time between stunning and exsanguination can thereby be substantially shortened.

The object is also achieved by an arrangement having the features mentioned at the beginning, in that the apparatus for stunning is configured according to any one of claims 1 to 15 and the or each container is designed and configured for detachable connection to the or each injection pipe. In other words, the apparatus for stunning and the or each container form a mutually matched unit, in such a manner that the containers are adapted to the or each injection pipe of the apparatus for stunning. Each container on its own, and in particular also a plurality of containers stacked one above the other, is designed and configured to receive the or each injection pipe. This means that each injection pipe can be adapted to or in the container, so that it is possible to introduce the gas mixture flowing out of the injection pipes into only a single container.

Preferably, each container comprises at least one segment of a ventilation and air outflow column which extends through the inner volume of the container and has at least one ventilation and air outlet opening at a distance from the side walls. In the present case, ventilation refers to filling with the gas mixture, which can be introduced into the containers by means of pressure. Air outflow refers to the drawing off of the gas mixture from the container. Gas exchange, that is to say filling and drawing off, is thus ensured in a simple and effective manner. By the preferably central arrangement of the or each segment, even and uniform ventilation and air outflow is ensured for each container.

A preferred further development is characterised in that the or each segment of the ventilation and air outflow column is designed and configured for connection to corresponding segments of containers of the same construction. The stack-wise transport of a plurality of containers one above the other from stunning zone to stunning zone is thereby assisted, and in particular the containers of a container stack can be filled in a stunning zone by the or each injection pipe associated with the stunning zone.

Advantageously, a plurality of containers form a container stack, in such a manner that the container stack has a continuous ventilation and air outflow column which is formed by the segments and into which the or each injection pipe can be introduced. This configuration supports the advantages mentioned above.

A preferred further development is characterised in that the segments of the ventilation and air outflow column, and the ventilation and air outflow column formed therefrom, are designed and configured to receive the injection pipes and the adapter heads associated with the injection pipes. Secure "connection" of injection pipe and container is thereby ensured.

In an advantageous embodiment, the segments of the ventilation and air outflow column are designed and configured to receive the adapter heads by interlocking and/or frictional engagement. This permits particularly tight adaptation of the injection pipes to the containers.

Advantageously, the outer shape and size of each adapter head is matched to the inner shape and size of each segment of the ventilation and air outflow column. This design assists the simple and rapid adaptation of the injection pipes to the containers.

The object is also achieved by a method comprising the steps mentioned at the beginning, in that the gas mixture is guided directly into each individual container by means of at least one injection pipe which is movable relative to the or each container.

Preferably, the gas mixture is introduced into each individual container of a container stack by mechanical ventilation, so that the gas mixture inside the containers flows from the inside outwards. Instead of mechanical ventilation, any other type of delivery of the gas mixture directly into the containers is possible.

A particularly advantageous further development is characterised in that at least two containers arranged one above the other as a container stack are introduced into the stunning chamber in the region of the introduction station, and the containers of the container stack are discharged again singly in the region of the discharge station. Space-saving and efficient stunning is thereby achieved, on the one hand, coupled on the other hand with the advantages of a very short period of time between the end of the stunning operation and the suspension of the poultry animals from an overhead conveyor or the like for exsanguination of the poultry animals after cutting of the throat or head.

Advantageously, a plurality of containers of a container stack are filled with the gas mixture in all the stunning zones in succession by means of the or each injection pipe always from top to bottom or always from bottom to top, and the containers of the container stack are then discharged singly in the region of the discharge station in the order in which they were filled with the gas mixture. This means that all the containers of a container stack are filled with the gas mixture in the same order in all the stunning zones, namely consistently from top to bottom or consistently from bottom to top. With the FiFo principle, namely that the container of a container stack that is filled with the gas mixture first in all the stunning zones is also discharged from the apparatus first, a comparable and thus controlled stunning can take place for all the poultry animals in all the containers of a container stack.

A particularly advantageous further development is characterised in that the containers of the container stack are freed of the gas mixture again downstream of the stunning zones and upstream of the discharge station in the order in which they were filled with the gas mixture, and the containers of the container stack are then discharged singly in the order in which they were freed of the gas mixture. In other words, the gas mixture is first drawn off from the container of a container stack that was filled with the gas mixture first in the all the stunning zones, in order to maintain the so-called FiFo principle.

Advantageously, all the containers or container stacks pass in succession in the horizontal transport direction T through at least three stunning zones, namely a first phase I with a concentration of from 5 to 15% stunning gas in the gas mixture, a second phase II with a concentration of from 30 to 50% stunning gas in the gas mixture, and a third phase III with a concentration of from 50 to 100% stunning gas in the gas mixture. The number of phases and the concentration ranges thereof can of course vary.

A preferred embodiment is characterised in that, downstream of the stunning zones with phases I to III, possible fluctuations in the concentration of stunning gas in the gas mixture are compensated for by increasing or reducing the concentration of stunning gas in the gas mixture.

Advantageously, the gas concentration of the stunning gas in the gas mixture and/or the interior of the container are monitored.

A preferred further development is characterised in that the containers or container stacks are guided into the stunning chamber either vertically from above or horizontally from the side.

A particularly advantageous embodiment is characterised in that containers or container stacks are delivered to the stunning chamber at different positions of the stunning chamber in dependence on the size of the poultry animals and/or in dependence on the desired degree of stunning of the poultry animals in the containers. In other words, the distance between delivery and discharge of the containers or container stacks can thus be varied in terms of time (throughput time) or space (path length).

Further advantages resulting therefrom have already been described in connection with the apparatus according to the invention and the corresponding arrangement, which are suitable in particular for carrying out the method and, in order to avoid repetition, reference is therefore made to the corresponding passages.

BRIEF DESCRIPTION OF THE DRAWINGS

Further expedient and/or advantageous features and further developments of the apparatus according to the invention and of the arrangement, as well as preferred method steps of the method according to the invention, will become apparent from the dependent claims and the description. Particularly preferred embodiments of the invention will be described in greater detail by means of the accompanying drawing, in which:

DETAILED DESCRIPTION OF THE DRAWINGS

Figure 1:
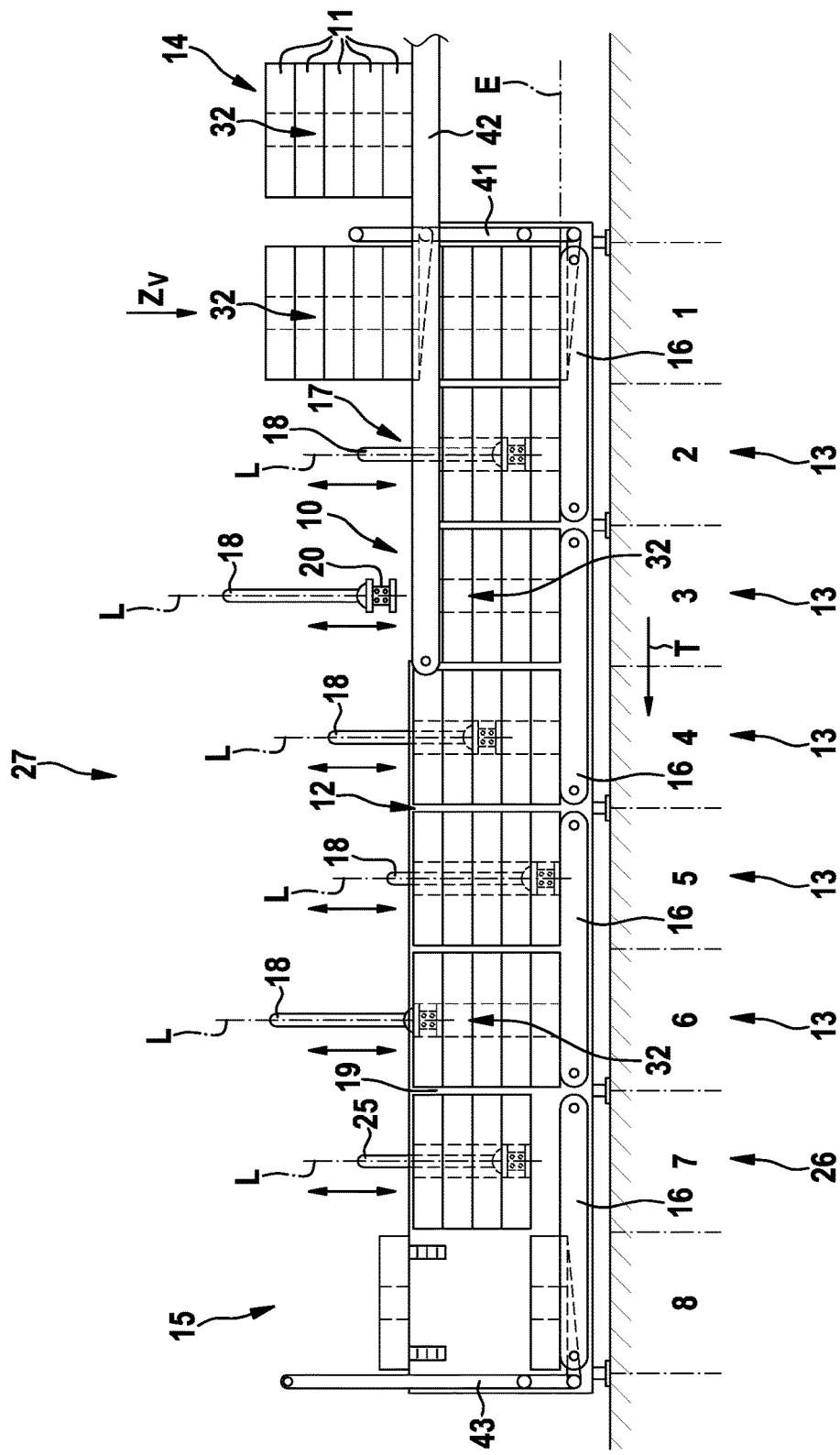
FIG. 1 shows a schematic representation of a preferred embodiment of the apparatus according to the invention in a side view.

The apparatus 10 shown in the drawing is used for stunning poultry animals, namely broilers, which are transported through the stunning chamber in five containers arranged one above the other as a container stack. However, the apparatus according to the invention is also used in the same manner for stunning poultry animals which are transported through the stunning chamber in individual containers or in container stacks formed of two or more containers arranged one above the other. The apparatus is of course also suitable for stunning other poultry animals, such as geese, ducks or the like.

FIG. 1 shows an apparatus 10 which is designed and configured for stunning live poultry animals which are intended for slaughter and are located in containers 11, by a gas mixture comprising a stunning gas. The apparatus 10 comprises a stunning chamber 12 having at least two stunning zones 13, an introduction station 14, arranged on the inlet side of the stunning chamber 12, for the or each container 11 containing live poultry animals and a discharge station 15, arranged on the outlet side of the stunning chamber 12, for the or each container 11 containing stunned poultry animals, at least one transport conveyor 16 for transporting the or each container 11 in the transport direction T through the stunning zones 13 from the introduction station 14 to the discharge station 15, as well as means 17 for delivering the gas mixture into the stunning zones 13 of the stunning chamber 12.

This apparatus 10 is characterised according to the invention in that the means 17 for delivering the gas mixture comprises at least one injection pipe 18 which is designed and configured to be movable relative to the container 11 for detachable connection to the or each container 11 and for detachment therefrom, in such a manner that each container 11 in the state of detachable connection to the or each injection pipe 18 can be filled with the gas mixture. The or each container 11 can optionally be movable towards and away from the or each injection pipe 18. Preferably, however, the or each container 11 or container stack is in a fixed position during filling with the gas mixture, so that the or each injection pipe 18 can be moved towards and away from the or each container 11 or container stack. A combined movement of the container 11 or container stack and the injection pipe 18 is optionally also possible. The relative movement between the or each container 11 or container stack and the injection pipe 18 can take place in different directions, preferably in the horizontal direction and particularly preferably in the vertical direction.

The features and further developments described in the following constitute preferred embodiments in themselves or in combination with one another. It is expressly pointed out that features which are combined in the claims and/or the description or which are described in a common embodiment can also constitute the above-described apparatus 10 functionally independently. The same is true for the arrangement described below and the method described below.

The embodiment of the apparatus 10 shown in the drawing has a total of five stunning zones 13. However, the number of stunning zones 13 can vary. For transporting the containers 11 or container stacks comprising one container 11 or preferably from two to ten containers 11 through the stunning chamber 12 there are provided a plurality of transport conveyors 16, which can be driven and controlled together or preferably separately. Where a plurality of transport conveyors 16 are arranged one behind the other, they can be operated in a coordinated manner. The stunning chamber 12, as shown, is an open system, so that it does not have to be either closed on all sides or sealed with respect to the environment, especially since the containers 11 in themselves or as a container stack in each case form a substantially closed and optionally also gas-tight unit.

Each injection pipe 18 is designed and configured to move into the inside of each container 11 forming a container stack and to move out of the or each container 11, in such a manner that each container 11 of the container stack with the poultry animals located therein can be filled individually and directed from the inside with the gas mixture flowing from the or each injection pipe 18. The or each injection pipe 18 is preferably a rigid pipe element with an outlet for the gas mixture situated at the free end. However, the injection pipe 18 can also be a flexible hose element or any other component carrying a gas mixture. The design for movement into the inside and out of the inside also includes forms in which the injection pipe 18 can merely be moved up to and away from the container 11 in such a manner that the or each outlet is directed into the inside of the container 11. To that end, the injection pipe 18 does not necessarily have to project into the container 11 to be filled. The latter embodiment is preferred, however.

The stunning chamber 12 is preferably in the form of a closed stunning tunnel 19 and forms a horizontally oriented stunning line. The or each transport conveyor 16 is designed and configured to transport the or each container 11 or container stack horizontally along the stunning line in a plane E through the entire apparatus 10 and accordingly also from stunning zone 13 to stunning zone 13. The stunning tunnel 19 is preferably closed on all sides (except for the openings for delivering and discharging the containers 11 or container stacks). The stunning tunnel 19 can optionally also be in such a form that it is sealed with respect to the surroundings by means which are not shown explicitly, for example in the form of visible or non-visible locks or the like. Such means for sealing can also be present between the individual stunning zones 13.

Preferably, the or each injection pipe 18 is arranged above the transport path and is designed to be movable vertically up and down, in such a manner that the injection pipe 18 can be moved from an upper waiting position, in which the injection pipe 18 is positioned with its free end completely outside the container 11 of a container stack situated beneath the injection pipe 18 that is closest to the injection pipe 18, into a lower working position, in which the injection pipe 18 is positioned with its free end inside any desired container 11 of the container stack, and back. The injection pipe 18 can be moved downwards and upwards again smoothly and preferably stepwise from container 11 to container 11 of a stack.

Preferably, at least one injection pipe 18 is associated with each of the stunning zones 13, in such a manner that each of the stunning zones 13 can be exposed to a gas mixture, in particular having different concentrations of stunning gas. These injection pipes 18 are arranged fixedly in the horizontal direction in the transport direction T. In other embodiments, individual injection pipes 18 or all the injection pipes 18 can also be designed to be adjustable and movable horizontally in and contrary to the transport direction T. It is optionally also possible for an injection pipe 18 or a plurality of injection pipes 18 to be associated with only one stunning zone 13, which injection pipe or pipes is/are then movable from stunning zone 13 to stunning zone 13. Each position of the injection pipe 18 inside a container 11 represents a working position. FIG. 1 shows an apparatus 10 which has, by way of example, a total of eight sections 1 to 8. In section 3, an injection pipe 18 is in the waiting position. In sections 2 and 4 to 6, the injection pipes 18 are in a working position, but in different planes, that is to say in different containers 11 of a container stack as regards the height. The number of sections can vary, however.

Figure 4:
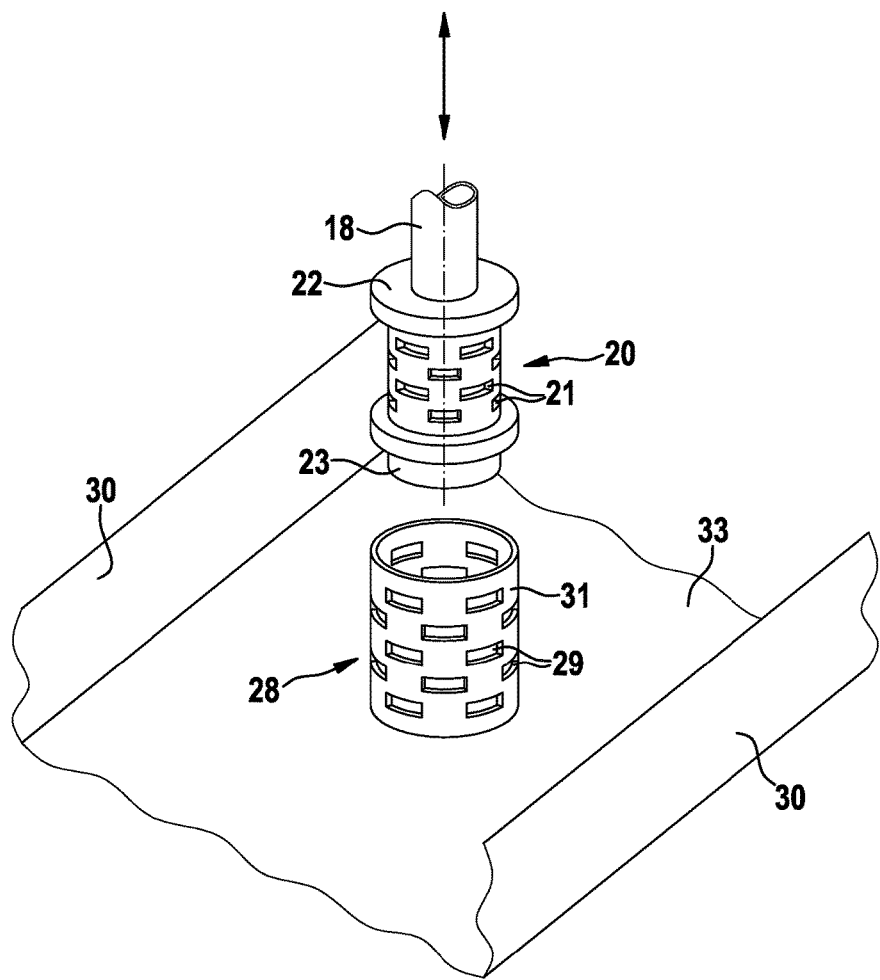
FIG. 4 shows an enlarged representation of an adapter head of an injection pipe.

Each injection pipe 18 has at its free end an outlet in the form of an adapter head 20. The adapter head 20 is designed and configured for adaptation of the injection pipe 18 to the or in the or each container 11 of a container stack, the adapter head 20 having at least one opening 21 for emission of the gas mixture. The adapter head 20, like the injection pipe 18 itself, preferably has a circular cross-section. In the region of the adapter head 20 there are provided, in the peripheral surface thereof, a plurality of openings 21 (see, for example, FIG. 4), which are preferably distributed evenly over the entire periphery, so that emission of the gas mixture at a 360° angle can take place. In alternative embodiments (not shown), each injection pipe 18 can also be provided with openings 21 over the entire (functional) length, so that all the containers 11 of a container stack can be filled with the gas mixture at the same time. In such a case, virtually the entire injection pipe 18 serves as an adapter head 20.

Preferably, the adapter head 20 is in the form of a plug-in connector, in such a manner that each injection pipe 18 can be connected—preferably in a sealed manner—to each container 11 by means of its adapter head 20 without a fixing means, in such a manner that on the one hand the or each opening 21 for filling the or each container 11 with the gas mixture points into the interior of the container 11 and on the other hand the adapter head 20 is sealed outwardly relative to the container 11 with respect to the surroundings, that is to say with respect to adjacent containers 11 of a container stack or with respect to the container-free surroundings. To that end, the or each opening 21 for filling is arranged in the adapter head 20 in the longitudinal-axis orientation of the adapter head 20 between two sealing elements 22, 23 of the adapter head 20. Ultimately, it is sufficient for the injection pipe 18 to be movable into a container 11 in such a manner that the upper sealing element 22 seals the container interior at the top, while the lower sealing element 23 seals the container interior at the bottom, so that the or each opening 21 points into the interior and guides the gas mixture purposively and solely into one container 11, with which the injection pipe 18 is presently associated. The injection pipe 18 can optionally have further sealing elements distributed over its length, preferably at the spacing of the containers 11, which further sealing elements prevent the mixing of air/gas mixture between the individual containers 11 of a container stack.

In the exemplary embodiment, two injection pipes 18 are associated with each stunning zone 13 in sections 2 to 6, which injection pipes are preferably connected to a common supply pipe 24. The two injection pipes 18 with the associated supply pipe 24 preferably form a movable unit, which is designed to be movable up and down. Preferably, each of these units is connected to its own separate gas supply, so that an individual and variably controllable concentration of the stunning gas in the gas mixture can be provided in each stunning zone 13. The number of injection pipes 18 per unit which are connected to a common supply pipe 24 can vary.

Each of these units or each injection pipe 18 optionally has an associated means (not shown explicitly) for determining the gas concentration of the stunning gas in the gas mixture inside the container 11 and/or for visually monitoring the interior of the container 11. This monitoring system in the form of the means is preferably arranged at the or each injection pipe 18. This means can comprise gas sensors and/or a camera and/or other detection components which supply relevant information in connection with the stunning operation in a container. The means is particularly preferably arranged in the region of the adapter head 20. In order to ensure monitoring that is as precise and comprehensive as possible, the or each injection pipe 18, or at least the adapter head 20, can be designed to rotate about the longitudinal axis L of each injection pipe 18. This possibility of rotating drivability exists in principle for each injection pipe 18 or its adapter head 20.

Particularly preferably, the apparatus 10 comprises a control and/or regulating unit, by means of which the transport speed of the or each transport conveyor 16 and the composition of the gas mixture in terms of the concentration of the stunning gas in the gas mixture can be controlled and/or regulated. By means of the control and regulating unit, the further components of the apparatus 10, such as, for example, the or each introduction station 14, the discharge station 15 and the injection pipes 18, can be controlled and regulated—in terms of their movability. Preferably, all the zones in sections 1 to 8, that is to say the introduction region, the stunning zones 13, the evacuation region and the discharge region, can be controlled and regulated separately and independently of one another. However, a coordinated and continuous mode of operation of the apparatus 10 is ensured by means of the main control and/or regulating unit.

At least two introduction stations 14 are optionally provided along the transport path. In the embodiment shown, three introduction stations 14 are provided by way of example, which introduction stations are arranged one behind the other in the transport direction T of the transport conveyors 16. In other words, an introduction station 14 is associated with each of the sections 1, 2 and 3. The introduction stations 14 are designed on the one hand to deliver the containers 11 or container stacks horizontally in order to position the containers 11 or container stacks vertically above the transport conveyors 16. On the other hand, the introduction stations 14 have a common lift device 41 or in each case separate lifting devices 41, which are designed and configured to lower the containers 11 or container stacks in the respective section 1 to 3 vertically onto the transport conveyor 16.

By means of a delivery device 42, which can be part of the apparatus 10, the containers 11 or container stacks are to be transferred to the apparatus 10. A pushing mechanism can be provided in the region of the horizontal introduction stations 14, by means of which pushing mechanism the containers 11 or container stacks can be pushed transversely to the transport direction T into a position above the transport conveyor 16 of the apparatus 10. The containers 11 or container stacks can be lowered by means of the lift device 41. The or each introduction station 14 can optionally also be designed and arranged to deliver the containers 11 or container stacks directly onto the transport conveyors 16. It is also possible for the containers 11 or container stacks to be delivered onto the transport conveyors 16 by an introduction station 14 horizontally in the transport direction T from the end face of the apparatus 10 or laterally in the transport plane E.

Figure 2:
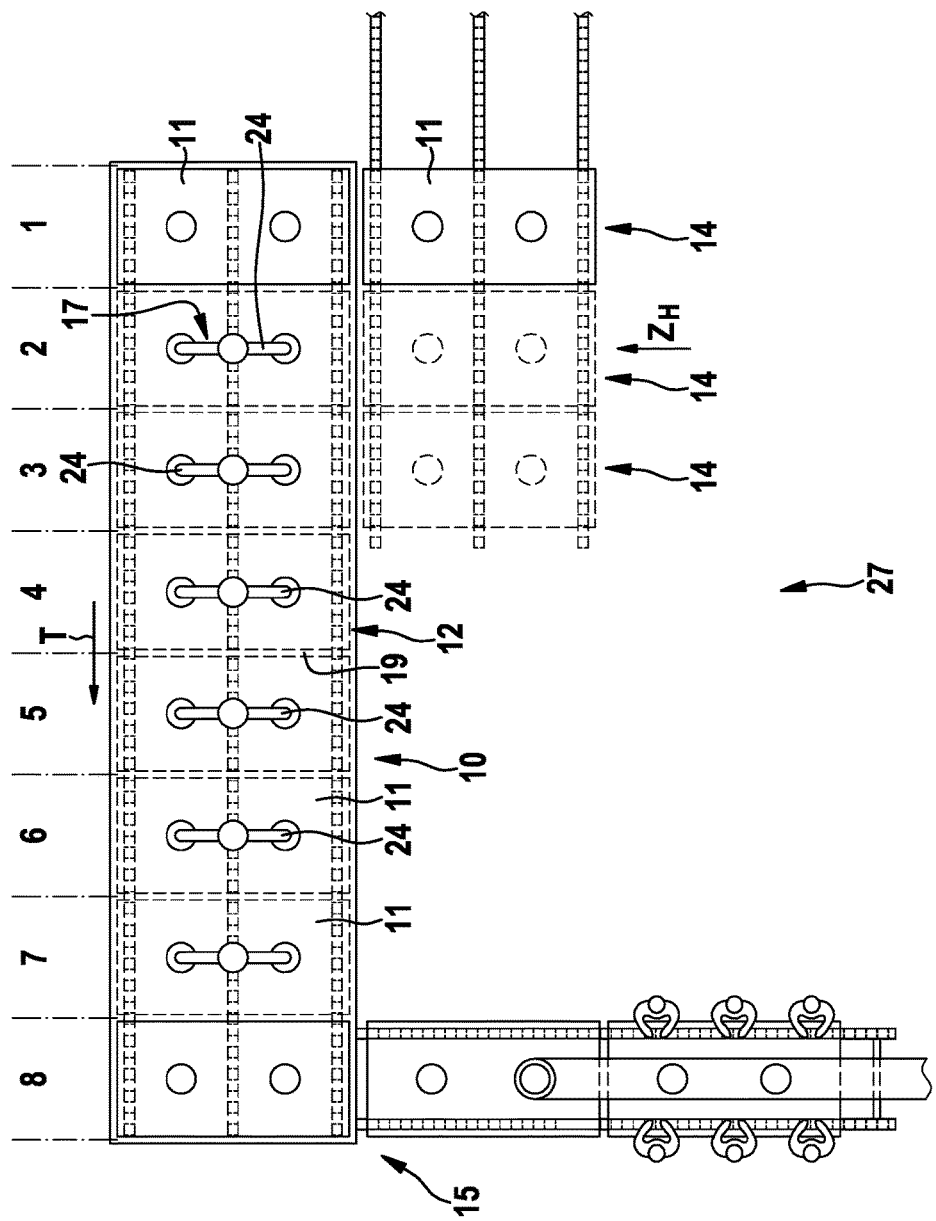
FIG. 2 shows a schematic representation of the apparatus according to FIG. 1 in a top view.

By means of the preferred configuration of the introduction stations 14 one behind the other in the transport direction T, as can be seen particularly clearly in FIG. 2, the length of the transport path can be varied in dependence on the size of the poultry animals that are to be delivered. Containers 11 with large poultry animals can be delivered, for example, into section 1 by means of the forwardmost horizontal introduction station 14 in the transport direction T, in order to create a transport path that is as long as possible. Containers 11 with poultry animals of medium size can be delivered into section 2 by means of the introduction station 14. Containers 11 with small poultry animals can be delivered into section 3 by the introduction station 14. The number of introduction stations 14 and the positions thereof can vary. Overall, the number of sections 1 to 8 can also be reduced or increased.

At least one suction pipe 25 for drawing off the gas mixture from each container 11 is arranged in the transport direction T downstream of the stunning zones 13 and upstream of the discharge station 15, the or each suction pipe 25 preferably being of the same construction as the injection pipe 18. In the example, the suction pipe 25 is situated in section 7 of the apparatus 10 to form an evacuation zone 26. With regard to the configuration, arrangement and mode of operation of the or each suction pipe 25, reference is made, in order to avoid repetition, to the description relating to the or each injection pipe 18. In the case where all the containers 11 of the container stack are filled with the gas mixture simultaneously, the or each suction pipe 25 also has openings over its entire length, similarly to the corresponding injection pipe 18, so that all the containers 11 of a container stack can be freed of the gas mixture at the same time.

The discharge station 15 arranged at the outlet-side end of the transport path for discharging the containers 11 singly is designed and configured according to the first-in-first-out principle (FiFo). This demonstrates that the first container 11 of a container stack to be discharged from the stunning tunnel 12, and more precisely from the evacuation zone 26, is the container that was first filled with the gas mixture in the stunning zones 13 and correspondingly first freed of the gas mixture in the evacuation zone 26. Accordingly, the FiFo principle relates not to the order in which the containers 11 or container stacks are introduced into the stunning chamber 12 but to the order in which they are filled with the gas mixture and freed of the gas mixture. For separating the containers 11 from a container stack, corresponding auxiliary means can be provided, for example in the form of lift elements, pushing or pulling elements or the like. The individual containers 11 of a container stack can be discharged from the apparatus 10 by a lift device 43.

In further embodiments not shown explicitly, it is possible, in a departure from the linear extension according to FIGS. 1 and 2, for the individual sections of the apparatus 10, that is to say, for example, the stunning zones 13 and the evacuation zone 26, also to be arranged one behind the other in a curved, circular (to form a carousel-like arrangement) or meandering orientation.

The invention also describes an arrangement 27 for stunning live poultry animals which are intended for slaughter and are located in containers 11, by a gas mixture comprising a stunning gas, which arrangement comprises an apparatus 10 for stunning live poultry animals which are intended for slaughter and are located in containers 11, by means of a gas mixture comprising a stunning gas, as well as at least one container 11 for transporting the poultry animals through the apparatus 10. This arrangement 27 is characterised according to the invention in that the apparatus 10 for stunning is configured and the or each container 11 is designed and configured for detachable connection to the or each injection pipe 18. In other words, the apparatus 10 is configured as described above. The or each container 11 is adapted to produce an active connection with the or each injection pipe 18 of the apparatus 10. The active connection describes a state in which the or each injection pipe 18 can be brought together with the or each container 11 in such a manner that the filling of each individual container 11 with the gas mixture flowing out of the or each injection pipe 18 is ensured. In other words, each container 11 has a corresponding inlet.

There come into consideration as containers 11 in particular the transport containers by means of which the poultry animals are transported by truck or the like from the farms to the slaughterhouses, so that transfer of the poultry animals is avoided. Each container 11 comprises at least one segment 28 of a ventilation and air outflow column, which extends through the inner volume and has at least one ventilation and air outflow opening 29 at a distance from the side walls 30. The segments 28 of the ventilation and air outflow column serve to ventilate the poultry animals adequately and uniformly during transport of the poultry animals and during the lairage phase before the slaughterhouses. This or each segment 28, containers 11 can also have two or more such segments 28, forms the inlet for an injection pipe 18. The segments 28 preferably have a circular cross-section. Each segment 28 is formed almost from a tubular section 31 which is open to the top and to the bottom at both end faces. At least one opening 29 is formed in the lateral surface of the section 31. A large number of ventilation and air outflow openings 29 are preferably provided over the periphery of the section 31.

The or each segment 28 of the ventilation and air outflow column is designed and configured for connection to corresponding segments 28 of containers 11 of the same construction. This has the result that a container stack formed of two or more containers 11 has at least one continuous ventilation and air outflow column 32 formed of the segments 28, into which the or each injection pipe 18 can be introduced. To that end, the segments 28 of the ventilation and air outflow column and the ventilation and air outflow column 32 formed therefrom are designed and configured to receive the injection pipes 18 and the adapter heads 20 associated with the injection pipes 18. The segments 28 of the ventilation and air outflow column are preferably designed and configured to receive the adapter heads 20 by interlocking and/or frictional engagement. The outer shape and size of each adapter head 20 is preferably matched to the inner shape and size of each segment 28 of the ventilation and air outflow column, so that the adapter heads 20 can be inserted into the segments 28 and the interior of the container 11 can be sealed with respect to the surroundings by means of the sealing elements 22, 23. In the embodiment shown, the segments 28 are oriented in the vertical direction. However, horizontally extending segments 28 are also possible.

The containers 11 preferably have a closed bottom wall 33 and closed side walls 30. Openings, preferably ventilation and air outflow openings, can optionally be provided in the side walls 30. Each container 11 is closed to the top, preferably in a sealing manner or in a non-sealing manner, either by a bottom wall 33 of a container 11 located above it in the container stack or by a lid, which then has an inlet for the or each injection pipe 18. By this configuration, each container 11 constitutes, as it were, its own separate stunning chamber.

For all the above-described embodiments of the apparatus 10, the arrangement 27 and the containers 11 or container stacks formed therefrom it is to be noted in principle that, in the case where a system is formed that is actually closed, that is to say is air-tight or gas-tight or at least almost air-tight or gas-tight, from which no significant amount of air or gas mixture is able to escape, equalisation means are provided. This demonstrates that the gas mixture introduced into the closed containers 11, the closed container stacks, the closed apparatus 10 or a closed chamber in which the apparatus 10 is arranged would, without equalisation means, lead to a pressure increase in the system because the volume in the closed system would increase as a result of the delivered gas mixture. In order to compensate for this additional volume, the equalisation means, for example in the form of suction devices, suction lines, exhaust hoods or the like, are provided. These equalisation means are not provided at all or are provided to only a limited extent in embodiments in which the containers 11 are partially open, in container stacks in which gaps are provided between the individual containers 11 of the container stack, or in which the apparatus 10, or the chamber in which the apparatus 10 is arranged, has ventilation slots or the like.

For checking the gas concentration in the container 11, in the container stack, in the apparatus 10 or in the chamber in which the apparatus 10 is arranged, gas sensors or other suitable measuring means can be provided. The gas sensors or other measuring means can be arranged, for example, in the containers 11 themselves. In other embodiments, the gas sensors or other measuring means can also be arranged at the positions inside the apparatus 10 at which the containers 11 or container stacks are exposed to the gas mixture or freed therefrom. The gas mixture drawn off, collected or otherwise evacuated by the above-described air exchange can be collected, stored and reused by appropriate means, as can the gas mixture drawn off in section 7 by means of the suction pipe 25 in order to free the containers 11 of each container stack.

Figure 3:
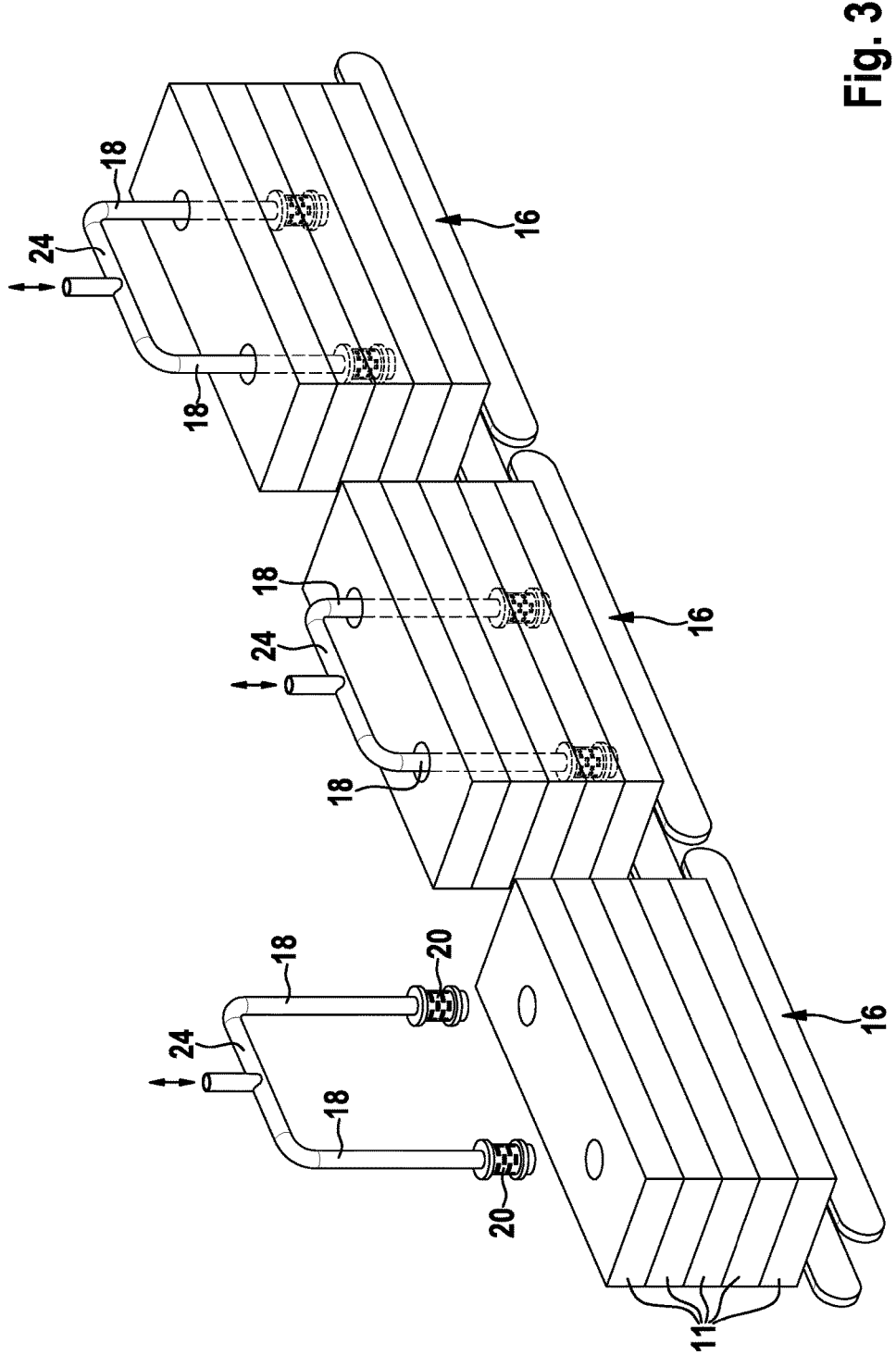
FIG. 3 shows a detailed representation of the apparatus, namely individual container stacks on transport conveyors with twin injection pipes.

In the case of containers 11 having more than one segment 28, as indicated, for example, in FIG. 3, one segment 28 can be designed and configured for delivering the gas mixture, while the second segment 28 serves as the above-mentioned equalisation means. The delivery of the gas mixture via one segment 28 takes place, as described, via an injection pipe 18. Drawing off via the other segment 28 for equalising the volume takes place, for example, via a suction pipe which is designed and configured similarly to the injection pipe 18 and in particular similarly to the suction pipe 25 of the evacuation zone 26. Gas sensors and/or cameras or other suitable measuring means can also be arranged in the region of the or each suction pipe, for example for determining the concentration of the stunning gas in the region of the delivery of the gas mixture and in the region of the emission of the gas mixture or for monitoring the poultry animals in the region of the suction pipe that is used as equalisation means in conjunction with a segment 28, with the aim of distributing the gas mixture as evenly as possible inside each container 11.

The method will be explained in greater detail in the following by means of the drawing. The method serves to stun live poultry animals which are intended for slaughter and are located in containers 11, by a gas mixture comprising a stunning gas. At least one container 11 containing live poultry animals is first transported by a delivery device 42 to the apparatus 10 and then delivered to a stunning chamber 12 by means of an introduction station 14. The or each container 11 is then transported through at least two stunning zones 13 of the stunning chamber 12 by at least one transport conveyor 16. The or each container 11 containing stunned poultry animals is then discharged from the stunning chamber 12 by a discharge station 15. During transport of the or each container 11, the poultry animals in the or each container 11 are exposed to the gas mixture in the stunning zones 13 of the stunning chamber 12.

This method is characterised according to the invention in that the gas mixture is guided directly into each individual container 11 by at least one injection pipe 18 which is movable relative to the or each container 11.

Preferably at least two containers 11 arranged one above the other as a container stack are introduced into the stunning chamber 12 in the region of the introduction station 14, transported as a container stack through the apparatus 10, and the containers 11 of the container stack are discharged again singly in the region of the discharge station 15. Particularly preferably, from four to seven containers 11 each form a container stack, which is then transported through the apparatus 10. After the delivery of the or each container stack, the container stack is transported in the horizontal transport direction T along the transport path of the stunning chamber 12. The container stack stops in each of the stunning zones 13, so that the or each injection pipe 18 can be lowered downwards into the container stack. A plurality of containers 11 of a container stack are filled with the gas mixture by means of the or each injection pipe 18 in all the stunning zones 13 in succession always from top to bottom or always from bottom to top. When all the containers 11 of the container stack have been filled in succession with the gas mixture, the or each injection pipe 18 is retracted fully from the container stack again, so that the container stack can be transported into the subsequent stunning zone 13. The described filling with the gas mixture is repeated in each stunning zone 13 until the container stack has passed through all the stunning zones 13. At the end of the transport path, the containers 11 are discharged singly. To that end, the container stacks are destacked in the order in which they were filled. Thus, if the container stack was filled from top to bottom in all the stunning zones 13, the uppermost container 11 of the container stack is also discharged first, followed by the second container 11 from the top, etc. If the container stack was filled from bottom to top in all the stunning zones 13, the lowermost container 11 of the container stack is discharged first, followed by the second container 11 from the bottom, etc.

The gas mixture is preferably introduced into each individual container 11 of a container stack by mechanical ventilation, so that the gas mixture flows within the containers 11 from the inside outwards. To that end, the injection pipes 18 are connected to a gas delivery device. The amount or volume of gas mixture and the composition of the gas mixture are controlled and/or regulated as required. The containers 11 of the container stack are optionally freed of the gas mixture again downstream of the stunning zones 13 and upstream of the discharge station 15 in the order in which they were filled with the gas mixture, and the containers 11 of the container stack are then discharged singly in the order in which they were freed of the gas mixture.

In the embodiment shown by way of example, all the containers 11 or container stacks pass in succession in the horizontal transport direction T through at least three stunning zones 13, namely a first phase I with a concentration of from 5 to 15% stunning gas in the gas mixture, a second phase II with a concentration of from 30 to 50% stunning gas in the gas mixture, and a third phase III with a concentration of from 50 to 100% stunning gas in the gas mixture. There are particularly preferably chosen in phase I a concentration of approximately 10% stunning gas in the gas mixture, in phase II a concentration of approximately 40% stunning gas in the gas mixture, and in phase III a concentration of approximately 60% stunning gas in the gas mixture (for a deep loss of consciousness, that is to say "stunned") or 100% stunning gas in the gas mixture (for irreversible loss of consciousness, brain death, that is to say "killed"). The gas concentrations can vary, as can the number of phases. Possible fluctuations in the preset values of the gas concentration can be compensated for downstream of the stunning zones 13 with phases I to III by increasing or reducing the concentration of the stunning gas in the gas mixture. Depending on the position of the introduction, that is to say depending on the location of the introduction station 14 along the transport path, phases I-III can be displaced along the transport path or can be located in different sections 2 to 6.

The containers 11 or container stacks can also be delivered to the stunning chamber 12 at different positions of the stunning chamber in dependence on the size of the poultry animals and/or in dependence on the desired degree of stunning of the poultry animals in the containers 11. Purely by way of example, containers 11 or container stacks containing large poultry animals or containing poultry animals that are to be stunned to brain death are introduced by means of the introduction station 14 in section 1; in the embodiment, the introduction is carried out firstly horizontally and transversely to the transport direction T in delivery direction $Z_H$ (see e.g. FIG. 2), so that the containers 11 or container stacks are located above the transport conveyor 16, and then vertically downwards in delivery direction $Z_V$ (see e.g. FIG. 1). Delivery can also take place in the plane E transversely to the transport direction T in the horizontal direction from the side of the introduction station 14 or in the transport direction T starting from the end face. Other options are likewise possible. After the container stack has been transported in transport direction T into section 2, the container stack stops and the or each injection pipe 18 is lowered into the containers 11 or the container stack and fills the containers 11 in succession with the gas mixture of phase I. The containers are then transported into section 3, in which the containers 11 of the container stack are filled in the same order with the gas mixture of phase II. The containers 11 of the container stack are then filled in the same order with the gas mixture of phase III in section 4. In sections 5 and 6, the containers 11 of the container stack can be kept at the level which was achieved in the previously described phases I to III by delivery of gas mixture having a higher or lower concentration of the stunning gas. In section 7, the containers 11 of the container stack are freed of the gas mixture again in the order in which they were filled, the gas mixture being drawn off. Immediately after evacuation of the gas mixture, each container 11 of the container stack is transferred singly into section 8, from which the container 11 is then discharged.

Containers 11 containing poultry animals of medium size can be delivered into the stunning chamber 12 in section 2 via the introduction station 14. After transport in transport direction T into section 3, the or each injection pipe 18 is lowered into the containers 11 or the container stack and fills the containers 11 in succession with the gas mixture of phase I. The containers 11 of the container stack are then transported into section 4, in which they are filled in the same order with the gas mixture of phase II. The containers 11 of the container stack are then filled in the same order with the gas mixture of phase III in section 5. In section 6, the containers 11 of the container stack can be kept at the level that was achieved in the previously described phases I to III by delivery of gas mixture having a higher or lower concentration of the stunning gas. In section 7, the containers 11 of the container stack are freed of the gas mixture again in the order in which they were filled, the gas mixture being drawn off. Immediately after evacuation of the gas mixture, each container 11 of the container stack is transferred singly into section 8, from which the container 11 is then discharged.

Containers 11 containing poultry animals of small size or containing poultry animals that are to be stunned only to a long, reversible loss of consciousness while avoiding brain death are delivered into the stunning chamber 12 in section 3 via the introduction station 14. After transport in transport direction T into section 4, the or each injection pipe 18 is lowered into the containers 11 or the container stack and fills the containers 11 in succession with the gas mixture of phase I. The containers 11 of the container stack are then transported into section 5, in which they are filled in the same order with the gas mixture of phase II. The containers 11 of the container stack are then filled in the same order with the gas mixture of phase III in section 6. In section 7, the containers 11 of the container stack are freed of the gas mixture again in the order in which they were filled, the gas mixture being drawn off. Immediately after evacuation of the gas mixture, each container 11 of the container stack is transferred singly into section 8, from which the container 11 is then discharged.

Filling of the containers 11 of the container stack with the gas mixture in sections 2 to 6 and drawing off of the gas mixture in section 7 can take place in succession or at the same time. Preferably, the gas concentration of the stunning gas in the gas mixture and/or the interior of the container are monitored. Monitoring can also include recording of the information. The information can be used to control and/or regulate the gas concentration as well as further parameters that influence the stunning process (such as, for example, the transport speed).

In further optional method sequences, all the containers 11 of a container stack can also be filled at the same time. In other words, the gas mixture is delivered to all the containers 11 of a container stack in all the stunning zones 13 at the same time and is drawn off again at the same time in the evacuation zone. In this case, the containers can also be discharged in stacks. It is further possible for the or each injection pipe 18 to move from stunning zone 13 to stunning zone 13, that is to say from section 2 to section 6.

When containers 11, container stacks, apparatuses 10 or the like are exposed to the gas mixture in closed systems, that is to say air-tight or gas-tight or at least almost air-tight or gas-tight systems, a type of forced ventilation is carried out via suitable equalisation means in order to keep the pressure inside the closed system substantially constant. By means of the forced ventilation, that is to say the controlled delivery of the gas mixture on the one hand and the controlled discharge of the excess volume from the container 11 in question on the other hand, the uncontrolled egress of the gas mixture from containers 11 of a container stack that are not in the process of being filled with the gas mixture can effectively be prevented. As well as ensuring a uniform distribution of gas mixture inside each container 11 of a container stack, the described procedure also serves to treat all the containers 11 of a container stack uniformly, because an exchange of air between the containers 11 of a container stack is effectively prevented.

Using the example of a container stack having more than two containers 11, in which each container 11 has two segments 28, an injection pipe 18 can project into the container stack, specifically into one air outflow and ventilation column formed by the segments 28, in order to fill the containers 11 in succession with the gas mixture. A suction pipe can project in parallel and at the same time into the same container stack, specifically into the other air outflow and ventilation column formed by the segments 28, in order to draw off the excess volume. A volume equilibration is thus created in each container 11 during filling, while the other containers 11 of the container stack are shielded with respect to the gas mixture.

The invention claimed is:

1. An apparatus, designed and configured for stunning live poultry animals which are intended for slaughter and are located in containers, by a gas mixture comprising a stunning gas, which apparatus comprises a stunning chamber having at least two stunning zones, an introduction station, arranged on the inlet side of the stunning chamber, for the or each container containing live poultry animals and a discharge station, arranged on the outlet side of the stunning chamber, for the or each container containing stunned poultry animals, at least one transport conveyor for transporting the or each container in the transport direction T through the stunning zones from the introduction station to the discharge station, as well as means for delivering the gas mixture into the stunning zones of the stunning chamber, characterised in that the means for delivering the gas mixture comprises at least one injection pipe which is designed and configured to be movable relative to the container for detachable connection to the or each container and for detachment therefrom, in such a manner that each container can be filled with the gas mixture when it is in the state of detachable connection to the or each injection pipe.

2. The apparatus according to claim 1, characterised in that each injection pipe is designed and configured to move into the interior of each container forming a container stack and to move out of the or each container, in such a manner that each container of the container stack, with the poultry animals located therein, can be filled with the gas mixture flowing out of the or each injection pipe individually and directed from the inside.

3. The apparatus according to claim 1, characterised in that the stunning chamber is in the form of a closed stunning tunnel and forms a horizontally oriented stunning line, and the or each transport conveyor is designed and configured along the stunning line for horizontally transporting the or each container in a plane E from stunning zone to stunning zone.

4. The apparatus according to one or more of claim 1, characterised in that the or each injection pipe is arranged above the transport path and is designed to be movable vertically up and down, in such a manner that the injection pipe can be moved from an upper waiting position, in which the injection pipe is positioned with its free end completely outside the container of a container stack located beneath the injection pipe that is closest to the injection pipe, into a lower working position, in which the injection pipe is positioned with its free end inside any container of the container stack, and back.

5. The apparatus according to claim 1, characterised in that at least one injection pipe is associated with each of the stunning zones, in such a manner that each of the stunning zones can be exposed to a gas mixture, in particular having a different concentration of the stunning gas.

6. The apparatus according to claim 1, characterised in that the or each injection pipe has at its free end an adapter head which is designed and configured for adapting the injection pipe to the or in the or each container of a container stack, wherein the adapter head has at least one opening for emission of the gas mixture.

7. The apparatus according to claim 6, characterised in that the adapter head is in the form of a plug-in connector, in such a manner that each injection pipe can be connected in a sealed manner to each container by its adapter head without a fixing means, in such a manner that, on the one hand, the or each opening for filling the or each container with the gas mixture points into the interior of the container and, on the other hand, the adapter head is sealed outwardly relative to the container with respect to the surroundings.

8. The apparatus according to claim 6, characterised in that the or each opening for filling is arranged in the adapter head in the longitudinal-axis orientation of the adapter head between two sealing elements of the adapter head.

9. The apparatus according to claim 1, characterised in that each injection pipe has an associated means for determining the gas concentration of the stunning gas in the gas mixture inside the container and/or for visually monitoring the interior of the container.

10. The apparatus according to claim 1, characterised in that said apparatus comprises a control and/or regulating unit by which the transport speed of the or each transport conveyor and the composition of the gas mixture in terms of the concentration of stunning gas in the gas mixture can be controlled and/or regulated.

11. The apparatus according to claim 1, characterised in that at least two injection pipes are associated with each stunning zone, which injection pipes are connected to a common supply pipe.

12. The apparatus according to claim 1, characterised in that at least two introduction stations are provided along the transport path.

13. The apparatus according to claim 1, characterised in that the or each introduction station is designed and configured to introduce the or each container onto the transport path vertically and/or horizontally.

14. The apparatus according to claim 1, characterised in that at least one suction pipe for drawing off the gas mixture from each container is arranged downstream of the stunning zones and upstream of the discharge station in the transport direction T, wherein the or each suction pipe is preferably of the same construction as the injection pipe.

15. The apparatus according to claim 1, characterised in that the discharge station arranged at the outlet-side end of the transport path is designed and configured to discharge the containers singly according to the first-in-first-out (FiFo) principle.

16. An arrangement for stunning live poultry animals which are intended for slaughter and are located in containers, is configured according to claim 1 and the or each container is designed and configured for detachable connection to the or each injection pipe.

17. The arrangement according to claim 16, characterised in that each container comprises at least one segment of a ventilation and air outflow column which extends through the inner volume of the container and has at least one ventilation and air outflow opening at a distance from the side walls.

18. The arrangement according to claim 17, characterised in that the or each segment of the ventilation and air outflow column is designed and configured for connection to corresponding segments of containers of the same construction.

19. The arrangement according to claim 17, characterised in that a plurality of containers form a container stack, in such a manner that the container stack has a continuous ventilation and air outflow column which is formed by the segments and into which the or each injection pipe can be introduced.

20. The arrangement according to claim 17, characterised in that the segments of the ventilation and air outflow column, and the ventilation and air outflow column formed therefrom, are designed and configured to receive the injection pipes and the adapter heads associated with the injection pipes.

21. The arrangement according to claim 17, characterised in that the segments of the ventilation and air outflow column are designed and configured to receive the adapter heads by interlocking and/or frictional engagement.

22. The arrangement according to claim 17, characterised in that the outer shape and size of each adapter head is matched to the inner shape and size of each segment of the ventilation and air outflow column.

23. A method for stunning live poultry animals which are intended for slaughter and are located in containers, by means of a gas mixture comprising a stunning gas, which method comprises the steps:
  delivering at least one container containing live poultry animals to a stunning chamber by means of an introduction station,
  transporting the or each container through at least two stunning zones of the stunning chamber by means of at least one transport conveyor, and
  discharging the or each container containing stunned poultry animals from the stunning chamber by means of a discharge station,
  wherein the poultry animals located in the or each container are exposed to the gas mixture in the stunning zones of the stunning chamber, characterised in that the gas mixture is guided directly into each individual container by at least one injection pipe which is movable relative to the or each container.

24. The method according to claim 23, characterised in that the gas mixture is introduced into each individual container of a container stack by mechanical ventilation, so that the gas mixture inside the containers flows from the inside outwards.

25. The method according to claim 23, characterised in that at least two containers arranged one above the other as a container stack are introduced into the stunning chamber in the region of the introduction station, and the containers of the container stack are discharged again singly in the region of the discharge station.

26. The method according to claim 23, characterised in that a plurality of containers of a container stack are filled with the gas mixture in all the stunning zones in succession by the or each injection pipe always from top to bottom or always from bottom to top, and the containers of the container stack are then discharged singly in the region of the discharge station in the order in which they were filled with the gas mixture.

27. The method according to claim 26, characterised in that the containers of the container stack are freed of the gas mixture again downstream of the stunning zones and upstream of the discharge station in the order in which they were filled with the gas mixture, and the containers of the container stack are then discharged singly in the order in which they were freed of the gas mixture.

28. The method according to one or more of claims claim 23, characterised in that all the containers or container stacks pass in succession in the horizontal transport direction T through at least three stunning zones, namely a first phase I with a concentration of from 5 to 15% stunning gas in the gas mixture, a second phase II with a concentration of from 30 to 50% stunning gas in the gas mixture, and a third phase III with a concentration of from 50 to 100% stunning gas in the gas mixture.

29. The method according to claim 28, characterised in that, downstream of the stunning zones with phases I to III, possible fluctuations in the concentration of stunning gas in the gas mixture are compensated for by increasing or reducing the concentration of stunning gas in the gas mixture.

30. The method according to claim 23, characterised in that the gas concentration of the stunning gas in the gas mixture and/or the interior of the container are monitored.

31. The method according to claim 23, characterised in that the containers or container stacks are guided into the stunning chamber either vertically from above or horizontally from the side.

32. The method according to claim 23, characterised in that containers or container stacks are delivered to the stunning chamber at different positions of the stunning chamber in dependence on the size of the poultry animals and/or in dependence on the desired degree of stunning of the poultry animals in the containers.

* * * * *